(12) United States Patent
Tuculescu et al.

(10) Patent No.: US 12,689,706 B2
(45) Date of Patent: Jul. 21, 2026

(54) 1-CLICK VIDEO CALLING THROUGH TELEVISION

(71) Applicant: ONSCREEN, INC., Yorba Linda, CA (US)

(72) Inventors: Costin Tuculescu, Tustin, CA (US); Gerald Norton, Hoboken, NJ (US)

(73) Assignee: ONSCREEN Inc., Yorba Linda, CA (US)

( * ) Notice: Subject to any disclaimer, the term of this patent is extended or adjusted under 35 U.S.C. 154(b) by 143 days.

(21) Appl. No.: 18/658,781

(22) Filed: May 8, 2024

(65) Prior Publication Data

US 2024/0380862 A1 Nov. 14, 2024

Related U.S. Application Data

(60) Provisional application No. 63/464,874, filed on May 8, 2023.

(51) Int. Cl.
*H04N 7/14* (2006.01)
*H04N 21/422* (2011.01)

(52) U.S. Cl.
CPC ............. *H04N 7/142* (2013.01); *H04N 7/147* (2013.01); *H04N 21/4221* (2013.01)

(58) Field of Classification Search
CPC ..... H04N 7/142; H04N 7/147; H04N 21/4221
See application file for complete search history.

(56) References Cited

U.S. PATENT DOCUMENTS

| | | | | |
|---|---|---|---|---|
| 6,072,868 | A * | 6/2000 | Irvin ................. | H04M 1/27467 |
| | | | | 379/355.09 |
| 10,660,806 | B1 * | 5/2020 | Nelson-Herron ...... | G16H 80/00 |
| 11,523,189 | B1 * | 12/2022 | Riepling ............. | H04N 21/478 |
| 2010/0060788 | A1 * | 3/2010 | Blackburn ......... | H04N 21/4788 |
| | | | | 715/825 |
| 2010/0322595 | A1 * | 12/2010 | Kitamori ............... | G09G 5/003 |
| | | | | 386/279 |
| 2011/0207447 | A1 * | 8/2011 | Bhow ................. | H04M 1/2535 |
| | | | | 455/569.1 |
| 2012/0287220 | A1 * | 11/2012 | Ravi .................... | H04N 23/661 |
| | | | | 348/14.02 |
| 2014/0118468 | A1 * | 5/2014 | Purdy ................... | H04N 7/141 |
| | | | | 348/14.08 |

(Continued)

*Primary Examiner* — Stella L. Woo

(74) *Attorney, Agent, or Firm* — PatentPC PowerPatent; Bao Tran

(57) ABSTRACT

The present invention, titled "1-Click Video Calling Through Television," offers a simplified video calling solution for seniors or disabled individuals. It includes a TV-based video calling device, a cloud service, and a 1-button call option on the device, a USB-based connection, or a remote control. The device connects to a television via HDMI and uses the Internet to facilitate video calls with family, caregivers, and healthcare providers. With a single button press, users can easily initiate calls with pre-designated contacts. The invention simplifies video calling and enhances connectivity for seniors and disabled individuals. Features include customizable contact buttons on the remote control and automatic television input switching, ensuring a user-friendly experience. The cloud service securely stores contact information and supports seamless communication.

19 Claims, 2 Drawing Sheets

System Overview

(56)     References Cited

U.S. PATENT DOCUMENTS

| | | | |
|---|---|---|---|
| 2014/0120980 A1* | 5/2014 | Mariatos | H04N 7/141 |
| | | | 455/556.1 |
| 2014/0267578 A1* | 9/2014 | Rowe | H04N 21/43615 |
| | | | 348/14.11 |
| 2017/0006145 A1* | 1/2017 | Schriefer | G08B 21/0461 |
| 2019/0342625 A1* | 11/2019 | Fenn | H04N 21/4112 |
| 2022/0030101 A1* | 1/2022 | Castellani | H04M 3/42382 |
| 2022/0167040 A1* | 5/2022 | Richardson | H04R 29/004 |
| 2022/0191575 A1* | 6/2022 | Moon | H04N 21/41265 |
| 2023/0132415 A1* | 5/2023 | Dave | H04L 12/1822 |
| | | | 348/14.08 |

* cited by examiner

System Overview

ONSCREEN Device 200

1-CLICK VIDEO CALLING THROUGH TELEVISION

CROSS-REFERENCE TO RELATED APPLICATIONS

This application claims the benefit of U.S. Provisional Patent Application No. 63/464,874, filed on May 8, 2023, which is hereby incorporated by reference in its entirety.

PRIOR ART

U.S. Pat. No. 8,994,881 B2.
   Title: Method and Apparatus for Simultaneously Viewing Multimedia Content and Accepting an Incoming Video Call Communication
   Inventors: Fang-Yuan Shyu
   Publication Date: Mar. 31, 2015
   Description: This patent discloses a method and apparatus for enabling users to simultaneously view multimedia content and accept incoming video calls on a television. The system integrates a television with network communication capabilities, allowing for audio-visual communication. Key features include the use of a visual communication screen area to display incoming call information and multimedia content simultaneously, auto wakeup settings for the television, and user interaction via a remote control to accept or reject calls.
   Relevance: While this patent provides an integrated video calling solution on a television, it does not teach or suggest a one-click video calling feature using the television's remote control. It uses phone dialing to complete the connection. The existing system requires a television with special capabilities and does not work with commercially available televisions.
U.S. Pat. No. 11,539,921 B2
   Title: Television Receiver with a TV Phone Function
   Inventors: Iwabuchi, Mizosoe, Shimoda, Bondan, Sasamoto
   Publication Date: Jan. 3, 2023
   Description: This patent discloses a television receiver with an integrated video phone function, enabling video and voice communication. The system integrates a TV receiver, a camera, microphone, speaker, decoder, and encoder, allowing the television to switch between TV viewing mode and videophone mode. The system is designed to facilitate video calls while also displaying TV programs.
   Relevance: This patent describes a television with integrated video phone capabilities but does not include features such as one-click call initiation. User interaction is required to switch modes and handle calls, which contrasts with the simplified, automated approach of the current invention. It also works by making the video signal a broadcast signal, which is not required in our implementation.

DISTINCTIONS AND IMPROVEMENTS

The present invention, as disclosed in this application, provides a unique system for 1-click video calling through a television. Unlike the prior art, the current invention integrates the video calling feature directly into the television's remote control, enabling users to initiate video calls with a single button press. This simplifies the user experience and eliminates the need for additional devices or complicated setup procedures. The system is specifically designed for seniors and disabled individuals, offering customizable buttons and an easy-to-use interface.

BACKGROUND OF THE INVENTION

Field of the Invention

The present invention relates to video communication systems, and more specifically, to a system and method for enabling 1-click video calling through a television interface.

Description of Related Art

Video calling has become an increasingly popular mode of communication, allowing users to connect visually with friends, family, and colleagues regardless of geographical distance. Traditional video calling systems typically involve the use of computers, smartphones, or dedicated video calling devices. These systems often require the user to navigate multiple steps and interfaces to initiate a video call, which can be cumbersome and confusing, especially for non-technical users.

Several prior art solutions have attempted to integrate video calling functionality with televisions. For example, U.S. Pat. No. 8,994,881 discloses a video calling system using a dedicated video calling components integrated into a television. This system includes a camera, microphone, and a user interface for initiating and receiving video calls. However, this approach requires special television hardware and does not seamlessly integrate with the television's existing interface.

Similarly, U.S. Pat. No. 11,539,921 A1 describes a TV communication system that allows users to make video calls using a smart TV with a built-in camera and microphone. While this system integrates video calling capabilities into the television, it still necessitates navigating through menus and applications, which can be a barrier to quick and easy communication. It is also specialized televisions not already in users homes.

These existing solutions highlight a significant gap in the market: the need for a simplified, user-friendly method to initiate video calls directly through a television. The complexity and additional hardware requirements of current systems hinder their widespread adoption, particularly among users who are not tech-savvy or who desire a more streamlined process.

SUMMARY OF THE INVENTION

The present invention addresses these shortcomings by providing a system and method for 1-click video calling through a television. This invention integrates video calling functionality directly into the television's existing control systems, allowing users to initiate video calls with a single button press. By eliminating the need for computers and simplifying the user interface, the invention offers an intuitive and accessible solution for video communication, enhancing the overall user experience.

BRIEF DESCRIPTION OF DRAWINGS

The accompanying drawings, which are incorporated herein and form a part of the specification, illustrate various exemplary embodiments of the present invention and, together with the description, further serve to explain various principles and to enable a person skilled in the pertinent art to make and use the invention.

DETAILED DESCRIPTION OF THE INVENTION

Figure 1:
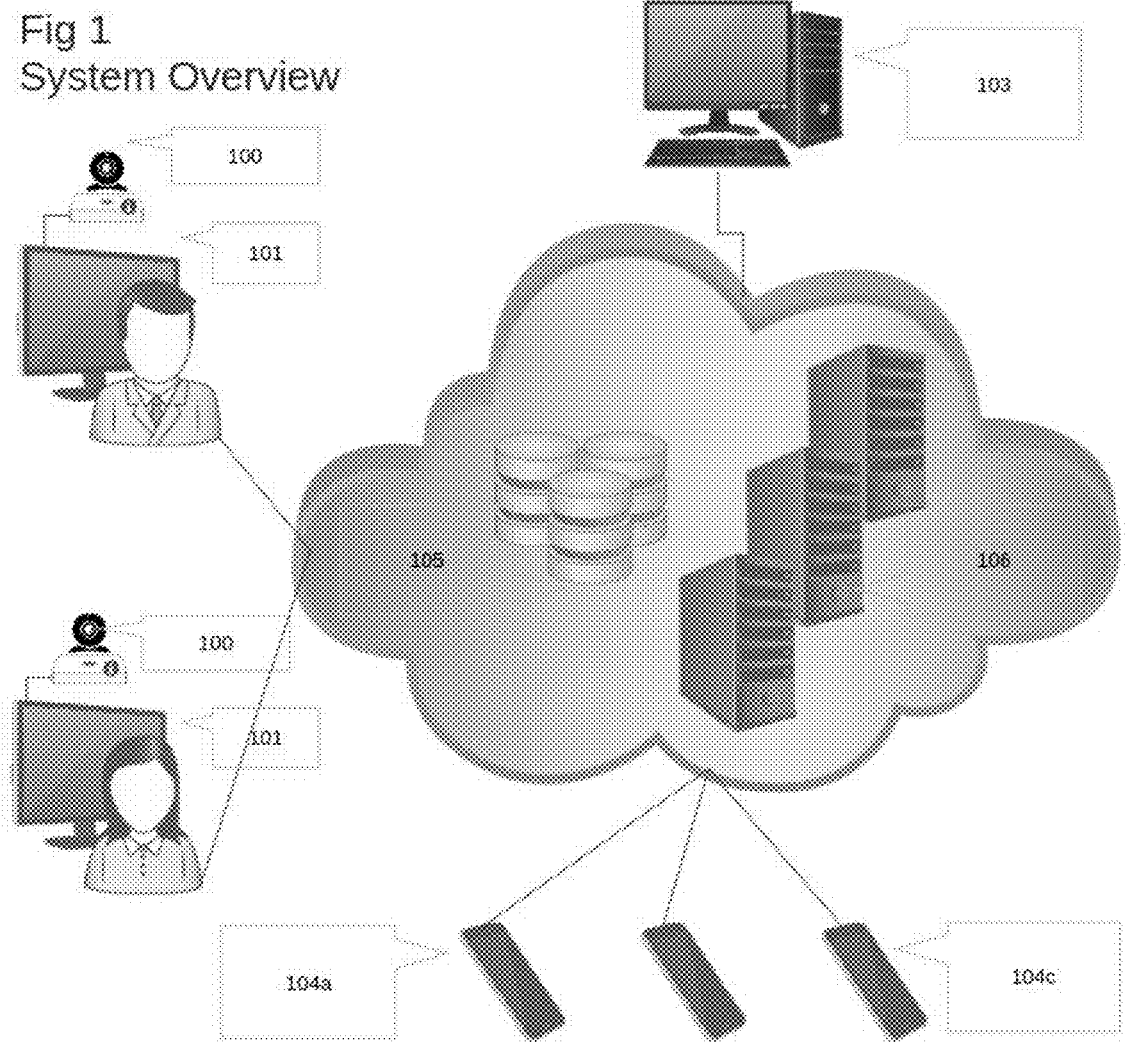
FIG. 1 is a block diagram illustrating the overall system architecture for 1-click video calling through a television, according to an embodiment of the present invention. The diagram shows the interaction between the television, mobile app, camera, microphone, and network connections.
Figure 2:
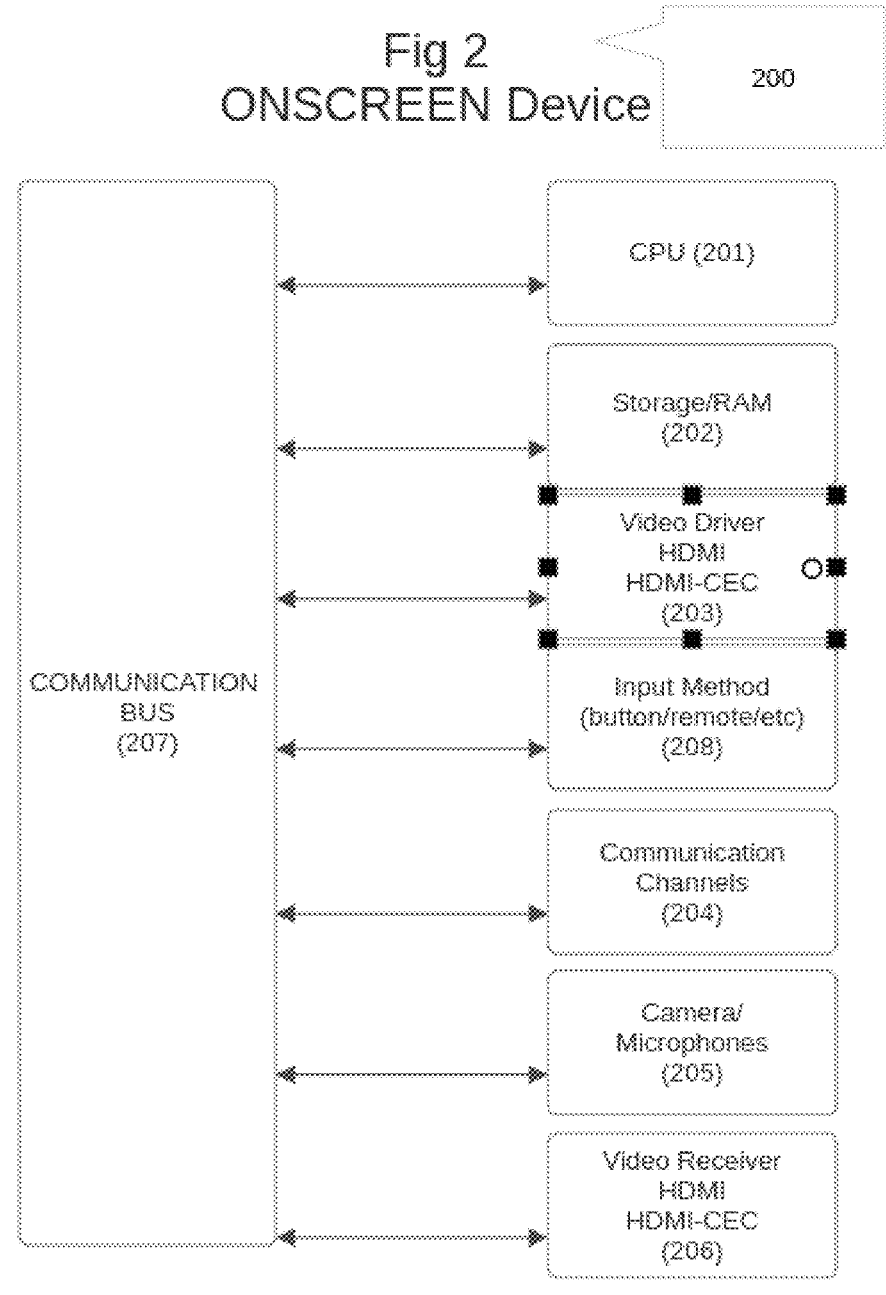
FIG. 2 is a block diagram illustrating the hardware component of one exemplary embodiment of the invention.

The present invention, titled "1-Click Video Calling Through Television," provides a simple, user-friendly video calling solution for seniors, enabling them to connect with family members, caregivers, and healthcare providers instantly via their television. The invention consists of a TV-based video calling device, a cloud service to facilitate video calls, and a 1-button call option, that is built directly on the device, through a USB-based connection with multiple buttons, or a remote control with one or more physical buttons (208).

The TV-based video calling device (100) is equipped with a camera, microphone, and speaker, and connects to a television (101) via HDMI or any other suitable interface. The device also connects to the Internet through Wi-Fi, Ethernet, or any other appropriate method.

The 1-button call option on the device (100) allows the user to click a single button to initiate a video call with a pre-designated contact. Alternatively, the USB-based connection or remote control features multiple buttons, each corresponding to a specific contact, such as a family member, caregiver, or healthcare provider. The buttons may be customizable with labels or pictures for easy identification by the senior user.

The cloud service (105, 106) stores the contact information of family members, caregivers, and healthcare providers, and enables video calls between the senior user and their contacts.

Upon pressing the call button, the system will start making a call and will go through the following steps:

a. Turn the TV on, if it's not already on.

b. Switch the TV input to the HDMI port of the TV video-calling device c. Show on the screen that the system is calling, and show the name and potentially show the image or avatar of the party being called.

d. Once the call is connected, the call button can be used as a hang-up button, to simplify the use of the system.

This invention aims to provide an accessible and straightforward communication solution for seniors, addressing their specific needs and simplifying the video calling process.

The invention claimed is:

1. A video calling system for seniors or disabled individuals, comprising:

a. a TV-based video calling device equipped with a camera, microphone, and speaker;

b. a cloud service configured to facilitate video calls;

c. a means for initiating a video call with one-touch operation by integrating a user interface, selected from the group consisting of a 1-button call option on the device, a USB-based connection with multiple buttons, and a remote control with one or more physical buttons in a TV-based system with a cloud service, wherein the video calling feature is configured such that, upon pressing a single dedicated button on the television remote control or a USB-based connection, the system automatically (a) turns on the television if it is not already on, (b) switches the television input to the video calling device, and (c) displays the status of the call, including the name and image or avatar of the contact being called, without requiring the user to navigate menus or switch modes, wherein each button is customizable with a label or picture for easy identification by the user.

2. The video calling system of claim 1, wherein the TV-based video calling device is configured to connect to a television via HDMI video interface.

3. The video calling system of claim 1, wherein the TV-based video calling device is configured to connect to the Internet through Wi-Fi, Ethernet, or a network.

4. The video calling system of claim 1, wherein the cloud service is configured to store contact information for family members, caregivers, and healthcare providers.

5. The video calling system of claim 1, wherein the buttons on the USB-based connection or remote control correspond to specific contacts and customized with labels or pictures for easy identification by the senior or disabled user.

6. The video calling system of claim 1, wherein the 1-button call option on the device allows the user to initiate a video call with a pre-designated contact by pressing the button.

7. The video calling system of claim 1, wherein the system is configured to turn on the television, switch the input to the HDMI port of the TV-based video calling device, and display the calling status on the screen when a call is initiated.

8. The video calling system of claim 1, wherein the call button is further configured to hang up the call, simplifying the user experience.

9. The video system of claim 1, wherein the buttons used to initiate a video call are customizable with labels or pictures for easy identification by the user.

10. The video system of claim 1, wherein the cloud service stores contact information of family members, caregivers, and healthcare providers.

11. The video system of claim 1, wherein upon pressing the call button, The video system automatically turns on the television if it is not already on.

12. The video system of claim 1, wherein upon pressing the call button, the system automatically switches the television input to the HDMI port of the video calling device.

13. The video system of claim 1, wherein upon pressing the call button, the system displays the calling status on the screen, including the name and image or avatar of the party being called.

14. The video system of claim 1, wherein the video calling feature is integrated directly into the television's remote control.

15. The video system of claim 1, wherein the video calling feature is accessible through both a USB-based connection and a remote control.

16. The video system of claim 1, wherein the call button is further configured to hang up the call.

17. The video system of claim 1, wherein the system architecture includes a television, mobile app, camera, microphone, and network connections.

18. The video system of claim 1, wherein the hardware components include at least a camera, microphone, speaker, and HDMI or other suitable interface to connect to the television.

19. The video system of claim 1, wherein the user interface is designed to be simplified and automated for seniors or disabled individuals.

* * * * *